June 5, 1956
B. COOPER ET AL
2,749,538
DIGITAL CONVERTER
Filed Dec. 16, 1952
3 Sheets-Sheet 1
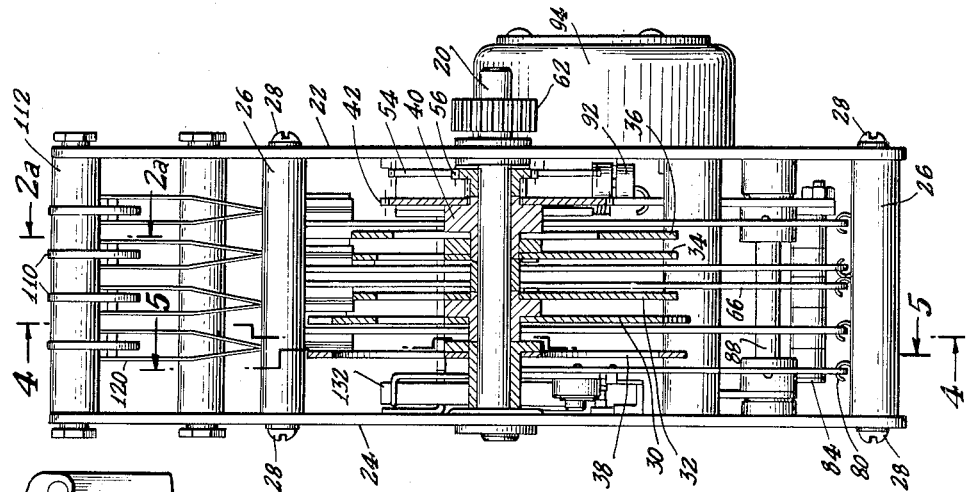
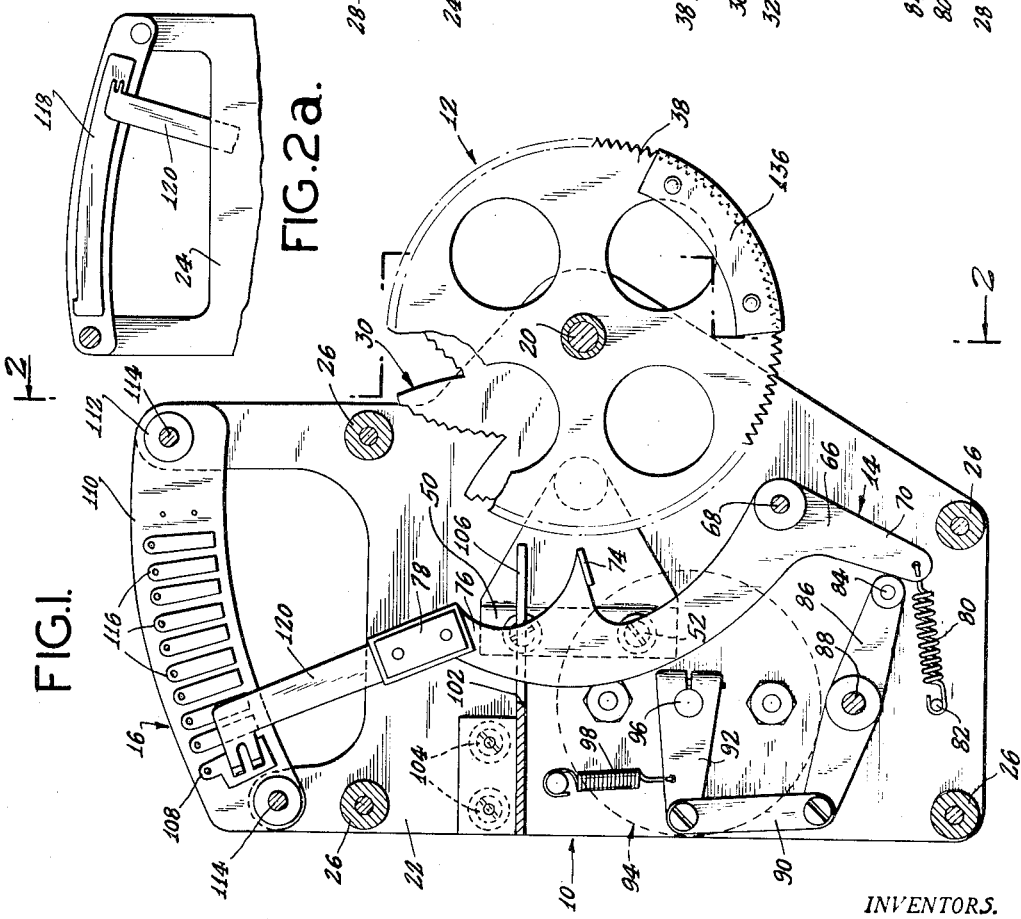
INVENTORS.
BENJAMIN COOPER
ALBERT F. HOHMANN
JOSEPH S. WAPNER
BY J. B. Felshin
ATTORNEY.

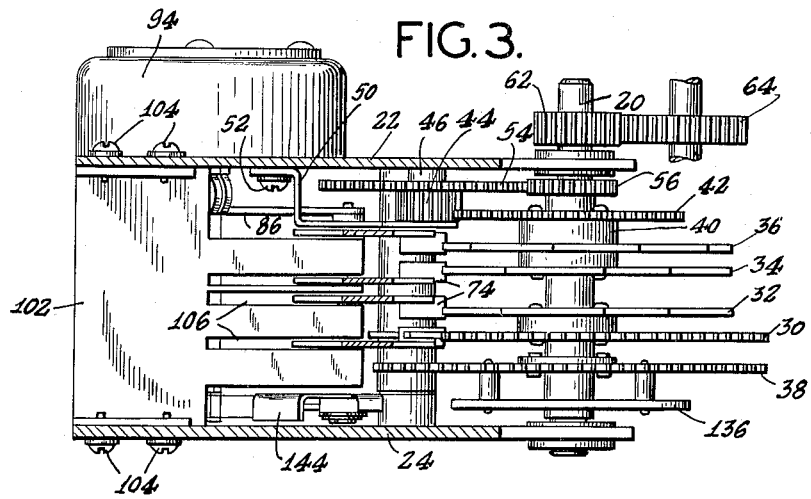
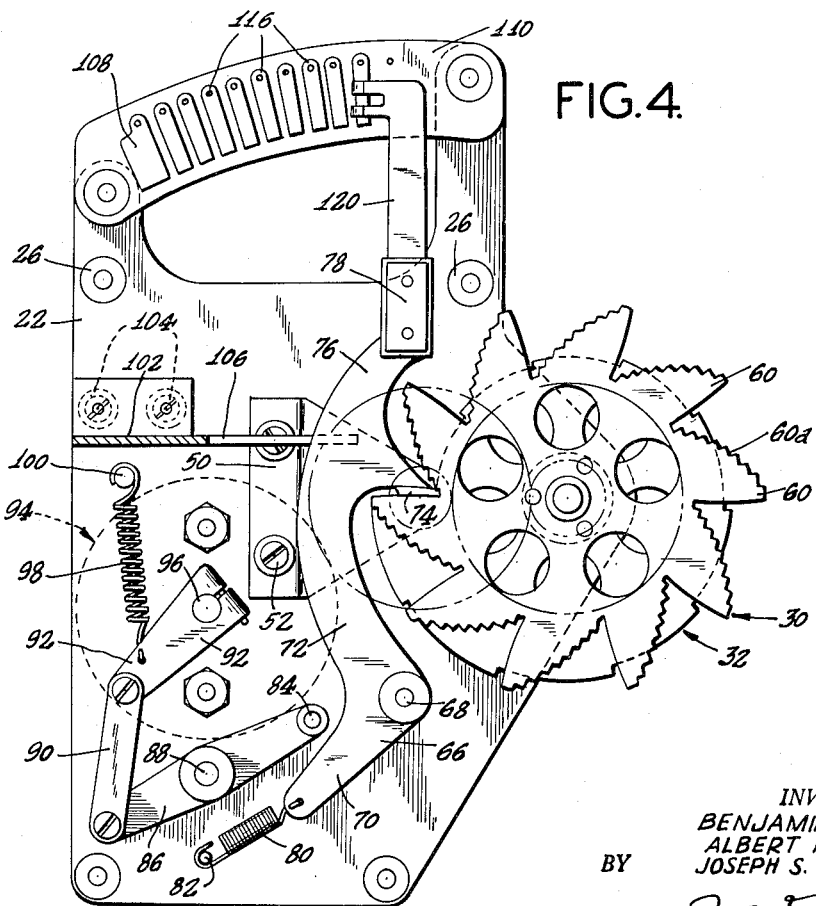

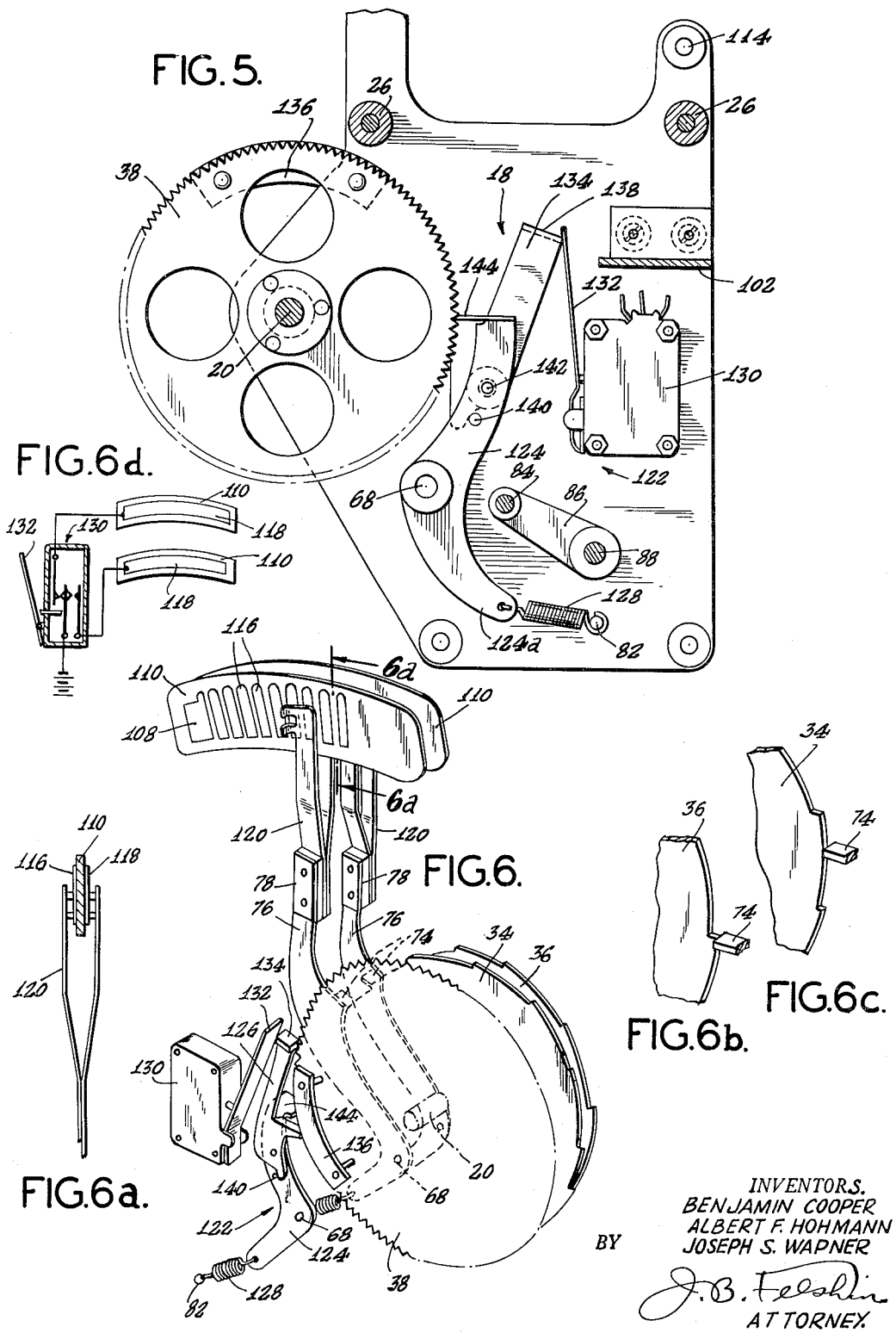

United States Patent Office 2,749,538
Patented June 5, 1956

2,749,538

DIGITAL CONVERTER

Benjamin Cooper, Brooklyn, N. Y., Albert F. Hohmann, Teaneck, N. J., and Joseph S. Wapner, Brooklyn, N. Y.; said Hohmann and said Wapner assignors to said Cooper Application December 16, 1952, Serial No. 326,306

15 Claims. (Cl. 340—345)

This invention relates to converting devices, and more particularly to improvements in a device for converting increments of angular shaft rotation into digital data.

The present invention comprises a device having a plurality of rotatable stepped wheels, and means to sense the relative positions of said wheels. There is further provided electrical circuit means controlled by the sensing means to provide circuit selection in accordance with the particular settings of the sensed stepped wheels. Heretofore, similar devices required stepped wheels of unreasonable size and diameter in order to obtain desired accuracy in converting angular increments to digital values. The present invention is relatively small and compact, and employs a novel means to achieve an accuracy heretofore impossible in a device of this type of comparable size.

The present invention further appertains to an electrical transfer mechanism that automatically transfers the sensing means from one stepped wheel to another stepping wheel when a critical point is being sensed on a higher order stepped wheel. In this manner, it is possible to obtain absolute accuracy with respect to the capabilities of the present structure.

Therefore, one of the principal objects of the invention resides in the provision of a digital converter having means to accurately measure a rotatable member and sense a stop position of said rotatable member in increments of 1/1000 of the total degree of rotation of said rotatable member.

Another object of the invention resides in the provision of a digital converter having dual means representing a single order and further having each of said means relatively offset one from the other.

A further object of the invention resides in the provision of circuit selecting means operable in accordance with the position of the rotatable member controlled by the sensing means.

And yet another object of the invention is to provide transfer means for selecting either one of said dual means in accordance with the critical position of said rotatable member.

Other ancillary objects will be, in part, hereinafter pointed out and will be, in part, hereinafter apparent.

In the drawings, Figure 1 is a side elevation of the digital converting device with one side frame plate cutting away to more fully illustrate the elements and srtucture of the device.

Figure 2 is a cross-sectional view taken along line 2—2 of Figure 1, illustrating the assembled relationship of the stepped wheels.

Figure 2A is a fragmentary detail of the switching means taken along line 2A—2A of Figure 2.

Figure 3 is a plan view of the device.

Figure 4 is a cross-sectional view taken along line 4—4 of Figure 2, illustrating a sensing finger in engagement with the units stepped wheel.

Figure 5 is a fragmentary cross-sectional view taken along line 5—5 of Figure 2, illustrating the electrical transfer switch and cooperating control elements.

Figure 6 is a detailed perspective view of the electrical transfer mechanism and the components of the invention illustrating in particular the offset relationship of the dual hundreds stepped wheels.

Figure 6A is a fragmentary detail of the wiping contacts taken along line 6A—6A of Figure 6.

Figure 6B is a fragmentary detail of a hundreds stepped wheel with its sensing finger disposed on a critical position thereof.

Figure 6C is a fragmentary detail showing the relative position of the other hundreds stepped wheel with its sensing finger in non critical position.

Figure 6D is a diagrammatic view of the switching means illustrating the electrical connections to the respective circuit means.

Referring to the drawings in detail, 10 generally designates the digital converting device which comprises a plurality of rotatable stepped wheels generally designated as 12, sensing means for sensing said stepped wheels, generally designated as 14, and a switching means controlled by the sensing means, generally designated as 16. There is further provided a transfer mechanism, generally designated as 18. As shown in Figures 1 and 2, the rotatable stepped wheel unit 12 is mounted on a shaft 20 interposed between and journalled in a pair of spaced side plates 22 and 24 respectively. The side plates 22 and 24 are disposed in spaced relation by means of spacers 26 and are secured by means of screws 28. The stepped wheel unit 12 consists of a unit wheel 30, a tens wheel 32 and a pair of hundreds stepped wheels 34 and 36, respectively. The unit stepped wheel 30 and the tens stepped wheel 32 are secured to the shaft 20 along with a star wheel 38. Hundreds stepped wheels 34 and 36, respectively, are secured to a sleeve 40 journalled on shaft 20. Also affixed to sleeve 40 is a gear 42 disposed in meshing engagement with a pinion 44 journalled on a stub shaft 46. Stub shaft 46 is interposed between the side wall 22 and plate 50 secured to the side wall 22 as by screws 52. Affixed to the pinion 44 and rotatable therewith is a gear 54 which is in turn disposed in meshing engagement with a pinion 56 secured to shaft 20. Thus, hundreds stepped wheels are rotatable by shaft 20 through the reduction gearing comprising gear 42, pinion 44, gear 54 and pinion 56 at a reduced ratio of ten to one. That is, with every rotation of shaft 20, hundreds wheels 34—36 will rotate one tenth of a revolution, and analogously, with every ten revolutions of shaft 20, stepped wheels 34—36 will rotate one complete revolution. It may be pointed out at this time that the star wheel is provided with one hundred teeth, and the unit stepped wheel is provided with ten equal steps, each step being further graduated into ten intermediate steps. The tens stepped wheel 32 is graduated into ten equal steps. Likewise, the hundreds stepped wheels 34—36 are similarly graduated into ten equal steps. Unit stepped wheel 30 differs from the other stepped wheels in that each primary step designated as 60 has graduated in the periphery thereof ten steps designated as 60A. There are ten primary steps 60 each being of equal radii relative to shaft 20. Therefore, each of the intermediate steps 60A of the respective primary steps 60 are of diminishing radii relative to shaft 20. The tens stepped wheel 32 has ten steps of diminishing radii equiangularly disposed around its periphery with the maximum radii being equal to the radii of the primary steps of the units stepped wheel 30. Similarly, the hundreds stepped wheels 34—36 are graduated into ten steps of diminishing radii with the maximum radii of the hundreds stepped wheels being equal to the maximum radii of the units and tens stepped wheels.

Shaft 20 may have affixed thereon a pinion, such as shown at 62, disposed in engagement with a gear 64 affixed to a driving member, not shown. This driving member may be in the form of a shaft rotatable under the influence of extraneous means. That is, should the present invention be applied to a measuring instrument, the pinion 64 would be rotated in accordance with the value measured by the measuring instrument. The ratio of gear 64 to pinion 20 is variable in accordance with the particular driving means being utilized. In the present example, it is proposed that the ratio be ten to one, whereas ten revolutions of the output shaft of the driving means will produce one complete revolution of shaft 20. Utilizing the stepped wheels hereinbefore described, the rotation of the output shaft may be measured in one thousand equal increments.

This measuring is accomplished by means of the sensing means which comprises a plurality of sensing levers 66 that are respectively pivotally journalled on a shaft 68 secured between the side plates 22—24. Each sensing lever consists of a depending arm 70, an arcuate upwardly extending portion 72, a transversely extending finger 74 and an upwardly extending portion 76. Portion 76 supports the switching means 78, hereinafter described in detail. Affixed to the lowermost portion of arm 70 of lever 66 is a spring 80 that is further anchored to a transverse shaft 82 interposed between side plates 22—24. Thus, as shown in Figures 1 and 4, levers 66 are urged in a clockwise direction about shaft 68 by means of the coil springs 80.

Means is provided to retain levers 66 in their most counter-clockwise position wherein the fingers 74 are not engaged with the respective stepped wheels. Directed toward this end there is provided a bail 84 interposed between a pair of spaced levers 86 that are pivotally mounted on a shaft 88. Shaft 88 is interposed between the side frame plates 22—24. One of the levers 86 has pivotally secured to its opposite end a link 90 which is in turn pivotally secured to solenoid arm 92. Solenoid arm 92 is part of a rotary solenoid unit 94 affixed to the outside of the side plate 22 and having a rotatable shaft 96 extending through a suitable aperture in the side plate 22. Shaft 96 has secured thereon the arm 92. This solenoid is of the rotary type wherein energization of the coil of the solenoid effects a rotation of its shaft through a predetermined angle. A spring 98 has one end thereof secured to the arm 92 and is anchored at its other end to a stud 100 affixed to the side plate 22. Spring 98 is so positioned to normally tension arm 92 in its most clockwise position whereby bail 84 engages arms 70 of the sensing levers 66 and pivots said levers out of engaging relation with the stepped wheels 30, 32, 34 and 36. When energized, solenoid 94 rotates its arm 92 clockwise, as shown in Figures 1 and 4, and accordingly pivots levers 86 clockwise and moves bail 84 out of engagement with the levers 66.

With the release of bail 84, springs 80 move the respective sensing levers 66 counter clockwise, until the fingers 74 thereon abut against their respective stepped wheels. The de-energization of solenoid 94 permits spring 98 to restore arm 92, levers 86 and bail 84 to their initial positions wherein the sensing levers 66 move out of engagement with the respective stepped wheels.

It will be noted that there is provided a guide plate 102 disposed between the respective side walls 22—24 and secured thereto by means of screws 104. The guide plate 102 is further provided with a plurality of slots 106 in which the respective sensing lever 66 resides. The slots 106 thus ensure exact registration of the finger 74 on the lever 66 with the respective steps on the associated stepped wheels.

As shown in Figure 1, the switching means 16 is positioned with wiping contact 78 in zero position. That is, sensing lever 66 is in its most counter clockwise position and the wiping contacts thereon are disposed for contact with the zero contact designated as 108. Switching means 16 generally comprise an insulated member 110 affixed in radial coplanar relation with the stepped wheels by means of insulated spacers 112. There are four insulated members 110, one being provided for each of the sensing levers 66. A pair of shafts 114 having spacers thereon retain insulated members 110 in their coplanar relationship. Imbedded in one side of each insulated member 110 are ten contacts 116 insulated one from the other. On the opposite side of the respective insulated members 110 is a single contact 118 extending substantially throughout the length thereof. The wiping contact 78 affixed to each of the respective sensing levers 66 comprises a bifurcated contact 120 that is mounted on the lever 66 but is insulated therefrom. Members 110 are assembled whereby they are interposed between the tines of the contact 120 so that one tine is disposed in wiping engagement with the contacts 108 or 116, while the other tine is disposed in wiping engagement with the contact 118. Thus, should the contacts 116 be individually connected to circuit means, not shown, while the contact 118 is common to them all, the sensing of the respective stepped wheels will in effect position the sensing fingers and their wiping contacts 120 on certain of the contacts 116, thereby completing a circuit from the common contact 118 through the wiping contacts 120 to the contact 116 which is in engagement with the wiping contact 120. Since there are zero to nine inclusive contacts, and there are zero to nine positions on the stepped wheels, symmetrical selection of these circuits is readily obtained in accordance with the positioning of the stepped wheels.

The present invention is not dealing with apparatus that is controlled by these stepped switches for this apparatus could be any of a multitude. It is sufficient to say that selective circuits can be set up under the control of the present device. It will be understood that devices such as the I. B. M. key punch, a Teletype transmitter, and other related devices could be controlled by this device.

Means are provided to ensure exacting registration of all of the respective sensing fingers 74 with their respective stepped wheels upon energization of the solenoid 94. To this end there is provided the star wheel 38 and a coacting stop mechanism generally designated as 122. This mechanism 122 comprises a lever 124 pivotally mounted on shaft 68 and provided with a terminal flange 126. The opposite end of lever 124 has secured thereto one end of a spring 128, the other end of which is secured to the cross shaft 82. Spring 128 is similar to the hereinbefore described spring 80 in that it urges lever 124 clockwise, as viewed in Figure 6, when bail 84 is released from engagement with said lever. With bail 84 so released, lever 124 pivots about the shaft 68, and flange 126 thereon contacts the star wheel 38 to secure said wheel against further rotation.

Referring in particular to Figures 5 and 6, the electrical transfer means are particularly well illustrated with relation to the hundreds wheels 34—36. The transfer means generally comprises a microswitch 130 affixed to the side wall 24, having its actuating lever 132 positioned for engagement with a lever 134 pivotally mounted on stopping lever 124. Lever 134 is adapted to co-act with a camming member 136 affixed to star wheel 38 at critical periods of measurements of the values on the stepped wheels 34—36. Lever 134 is provided with a flange 138 that normally abuts against actuator lever 132 of the microswitch 130. The lowermost portion of lever 134 is adapted to engage a stud 140 affixed to the lever 124. As shown in Figure 5, the inherent spring tension of lever 132 of the microswitch normally urges lever 134 counterclockwise about its pivot point 142 until it is stopped from rotating further by the limit stud 140. The lever 134 is further provided with a flange 144 that is engageable with the cam 136. In the event that star wheel 38 is stopped with cam 136 thereon in a position to be engaged by the flange 144, counterclockwise rotation of lever 124 during a sensing operation does not move the flange 134 a sufficient counterclockwise distance relative to the actuator 132 of microswitch 130 to permit the microswitch to be actuated. That is, microswitch 130 is of the double pole-double throw type, whereby actuator 132 holds certain of the switching contacts in normally closed relation. When pressure is released from the actuator 132, the normally closed contacts are permitted to open and other contacts close. Therefore, where star wheel 38 stops on any position other than the positions that cam 136 is effective to engage flange 144 of lever 134, said flange will not hold or retain the lever 134 in engagement with the actuator 132. The continued counterclockwise movement of the lever 134 enables actuator 132 to move counterclockwise a sufficient distance to open the normally closed contacts. It may be pointed out at this time, that microswitch 130 is of the type wherein one position completes a circuit through one switch to one of the switching members 110 and when actuator 132 is not held back and switch 130 is actuated, then the contacts of the switch are opened to transfer the connecting circuit from one member 110 to the adjacent member 110. This electrical transfer of the switching means is provided for a very definite purpose as will be hereinafter apparent. In a similar manner, counterclockwise rotation of the levers 86 carries the bail 84 into engagement with the lower arm 124A of lever 124 and concurrently restores said lever with the restoration of the sensing levers 66. This resets the microswitch mechanism to its initial switching position.

*Operation*

The present device operates in conjunction with a measuring instrument, not shown, as a means for converting the values measured by the measuring instrument into digital values which may be readily reproduced by printing means, also not shown. In operation, the driving member having the gear 64 thereon is rotated by the measuring instrument in accordance with the values that are being measured. Pinion 62 affixed to shaft 20 meshes with the gear 64 and rotates therewith. Depending upon the rotation of the driving member in the measuring instrument, pinion 62 has a predetermined number of teeth thereon to provide the correct ratio of shaft 20 rotation to that of the driving member rotation. Assuming that the measuring instrument is an electric potentiometer measuring degrees of Fahrenheit with a scale of four thousand to five thousand degrees, then the digital converter may operate to control printing mechanism to print the actual temperature to the nearest degree as desired. For example, should the measuring instrument indicate a temperature of 4,592 degrees, the driving member of the electric potentiometer would have rotated accordingly and shaft 20 would be at a specific angle. Energization of solenoid unit 94 would thereby initiate a sensing operation. The stepped wheels 30—32—34 and 36 are disposed in such positions whereby the sensing fingers associated therewith sense the equivalent of 592. Stepped wheel 30 is in such a position that its sensing finger 74 engages the sixth intermediate step of one of the primary steps thereon. The wiping contacts 120 carried by the lever 66 having sensing finger 74 thereon are stopped on the fifth contact 116, reading from left to right, as shown in Figures 1 and 4, thus completing a selected circuit to actuate the units digital reproducer of the printing mechanism. It may be pointed out at this time that the sensing finger is engaged on the sixth step since the first step is a zero position. The tens stepped wheel 32 has rotated to a position whereby the tenth step thereon, i. e. the step having the least radii relative to shaft 20, is disposed for engagement with the sensing finger 74 of the lever 66 associated therewith. The sensing finger accordingly moves clockwise a maximum distance whereby wiping contacts 120 are disposed in engagement with the last or highest contact 116. This, of course, establishes a circuit to the reproducing device to reproduce in the tens column the digital value of nine. The hundreds stepped wheels 34 and 36 have rotated substantially five steps. However, since the steps of the respective wheels 34 and 36 are offset one from the other, the sensing fingers associated with the respective levers may be stopped in different positions. As shown in Figures 6B and 6C, hundreds stepped wheels 34 and 36 are offset, one from the other in such a manner that wheel 34 is advanced approximately twenty degrees from zero position while wheel 36 is retarded a similar amount. Since all sensing fingers 74 are disposed in coplanar relation, the finger 74 in Fig. 6B, is disposed in engagement with the number "four" step on wheel 36 while finger 74, in Fig. 6C, is disposed in engagement with the number "five" step of wheel 34. When this situation exists, star wheel 38 will be so positioned as to effect an electrical transfer whereby only the switch means associated with wheel 34 is effective.

It is readily evident that wheel 36 would produce an erroneous result since the sensing finger 74 abuts against the number "four" step thereon. In an analogous manner, continued rotation of star wheel 38 past the point where cam 136 is not longer effective, automatically retransfers the effective circuit from stepped wheel 34 to stepping wheel 36. However, this continued rotation will also result in the rotation of hundreds stepped wheel 36 a sufficient distance whereby the next step or the "five" step, will be engaged by its associated sensing finger.

This transferring principle is controlled by the cam member 136 on the star wheel 38. As hereinbefore described, star wheel 38 makes one complete revolution for every hundred increments to be measured. Therefore, positioning of cam 136 on a predetermined portion of the star wheel; specifically, the portion wherein the trailing end of the cam terminates adjacent to the ninety-ninth tooth, insures the circuit transfer from one stepped wheel to the other stepped wheel. This is necessary since the stopping of star wheel 38 in any position near the completion of a revolution will position stepped wheel 34 in a critical position whereby the related sensing finger 74 could read erroneously. An example of this movement may be described as follows: The stepping wheels 30, 32, 34, 36 measure increments of rotation in 1,000 equal parts. Thus, one complete revolution may be measured as 360 degrees and 1/1000 of this revolution would be .36 degree. The rotation of stepped wheel 34 .36 degree is not measurable by the practical structure of sensing finger 74. Therefore, the sensing finger would engage the prior step and thus produce an erroneous reading. However, with the stepped wheel 36 being offset in equal value relative to the stepped wheel 34, the sensing finger 74 associated with the former stepped wheel engages a portion of the periphery of stepped wheel 36 that would could not produce an erroneous reading. Thus, the measurement of movement of rotation of stepped wheels 34—36 can be readily determined down to and including the nearest .36 degree. With the completion of digital reproduction, solenoid unit 94 may be de-energized and the digital converter is once more free to respond in accordance with the measured values of the measuring instrument. It may be further pointed out at this time that the sensing operation consumes but a fraction of a second. Therefore, the restraint placed on the measuring instrument by the locking of the star wheel is insufficient to harm the measuring instrument in any way.

Thus, there is provided a device that is practical and efficient and well adapted to meet the conditions of practical use.

The invention claimed is:

1. In a device of the class described, revoluble means adapted to be rotated by instrument means, a pair of stepped wheels affixed to and rotatable with said revoluble means, and having the peripherial steps of each of said pair of stepped wheels being radially offset one from the other, means to arrest the rotation of said revoluble means, means to sense the angular position of each of the arrested stepped wheels, circuit selecting means actuatable by each stepped wheel sensing means, means for deactuating one of said circuit selecting means, and means rotatable with said revoluble means and adapted to control said deactuating means to deactuate one of said circuit selecting means when said revoluble means is arrested in a predetermined angular zone.

2. In a device of the class described, in combination, a units stepped wheel, a tens stepped wheel, a pair of hundreds stepped wheels, each of said hundreds wheels being radially offset one from the other and all of said stepped wheels being rotatable, means to arrest the rotation of said stepped wheels, means to sense the angular positions of the arrested stepped wheels, circuit means associated with each sensing means, means to select one of the circuit means associated with the hundreds stepped wheels, and means rotatable with said stepped wheels and adapted to control said selecting means to select one of the circuit means when said hundreds stepped wheels are arrested in a predetermined angular zone.

3. In a device for converting angular positions of a shaft into digital values, rotatable means, a pair of stepped wheels affixed to and rotatable with said rotatable means, each of said stepped wheels being graduated equiangularly around the periphery thereof in steps of diminishing radii, and each complemental step on the respective stepped wheels being offset one from the other, means to arrest the rotation of said rotatable means, sensing means adapted to sense the respective stepped wheels, circuit means associated with each of the respective sensing means, means to make one of said circuit means effective and the other circuit means ineffective depending upon the arrested position of the stepped wheels, and means rotatable with said shaft for controlling said last means.

4. In combination, a rotatable shaft adapted to be rotated, a plurality of stepped wheels mounted on said shaft and rotatable therewith, means to arrest the rotation of said shaft, electrical circuit means associated with each of said stepped wheels selectively controlled by said stepped wheels, sensing means adapted to actuate said electrical circuit means to select certain circuits in accordance with the arrested position of said stepped wheels, electrical transfer means associated with said electrical circuit means, and means rotatable with said shaft for controlling said electrical transfer means to make one of said electric circuit means ineffective.

5. In combination, a rotatable shaft adapted to be rotated, a plurality of stepped wheels mounted on said shaft and rotatable therewith, means to arrest the rotation of said shaft, electrical circuit means associated with each of said stepped wheels selectively controlled by said stepped wheels, sensing means adapted to actuate said electrical circuit means to select certain circuits in accordance with the arrested position of said stepped wheels, electrical transfer means associated with said electrical circuit means, and means rotatable with said shaft for controlling said electrical transfer means to make one of said electric circuit means ineffective.

6. In combination, a rotatable shaft adapted to be rotated, a plurality of stepped wheels mounted on said shaft and rotatable therewith, means to arrest the rotation of said shaft, electrical circuit means associated with each of said stepped wheels selectively controlled by said stepped wheels, sensing means adapted to actuate said electrical circuit means to select certain circuits in accordance with the arrested position of said stepped wheels, electrical transfer means associated with said electrical circuit means, means controlled by said electrical transfer means for normally conditioning one of said electrical circuit means to be ineffective, and means rotatable with said shaft for controlling said electrical transfer means to condition said ineffective circuit means to be effective when said shaft is arrested in a predetermined angular zone.

7. In combination, a rotatable shaft adapted to be rotated, a plurality of stepped wheels mounted on said shaft and rotatable therewith, means to arrest the rotation of said shaft, electrical circuit means associated with each of said stepped wheels selectively controlled by said stepped wheels, sensing means adapted to actuate said electrical circuit means to select certain circuits in accordance with the arrested position of said stepped wheels, electrical transfer means associated with said electrical circuit means, means controlled by said electrical transfer means for normally conditioning one of said electrical circuit means to be ineffective, and means rotatable with said shaft for controlling said electrical transfer means to condition said ineffective circuit means to be effective when said shaft is arrested in a predetermined angular zone.

8. In a digital converter, the combination of a plurality of rotatable stepped wheels, including a units stepped wheel, a tens stepped wheels, and a hundreds stepped wheel, with a second hundreds stepped wheel offset radially from said first hundreds stepped wheel, means actuatable to arrest rotation of said rotatable wheels, sensing means operable upon actuation of said arresting means for individually sensing each of said stepped wheels, electrical circuit means including selectable switches, each being controlled by a respective sensing means, and means rotatable with said stepped wheels to select the electrical circuit means associated with one or the other of said hundred stepping wheels.

9. In a digital converter, the combination of a plurality of rotatable stepped wheels, including a stepped wheel of one value, a stepped wheel of a second value, and a stepped wheel of a third value, with a fourth stepped wheel of equal value to that of said third stepped wheel, and said fourth stepped wheel being offset radially from said third stepped wheel, means for sensing each of the stepped wheels, electric circuit means including plural switches associated with each stepped wheel, and means to select one of the electric circuit means rotatable with said stepped wheels associated with the hundred stepped wheels to make said selected circuit means effective and to make the circuit means associated with the other hundred stepping wheels ineffective.

10. In combination, a pair of stepped wheels, each having the periphery thereof divided equiangularly into steps of diminishing radii, and each step of one wheel being radially offset from its complemental step on the other wheel, means to rotate said stepped wheels in unison, means to arrest the rotating of said stepped wheels, means for sensing the differing angular positions of each of the arrested stepped wheels, circuit means including a common switching means selectively controlled by the sensed stepped wheels, and means rotatable with said stepped wheels to actuate said switching means to disable one of said circuit means when said stepped wheels are arrested in a predetermined angular zone, and to prevent actuation of said switching means thereby disabling the other of said circuit means when said stepped wheels are arrested out of said predetermined zone.

11. A rotatable shaft adapted to be rotated by instrument means, a stepped wheel affixed to said shaft and rotatable therewith, a sleeve journalled on said shaft, a pair of stepped wheels affixed to said sleeve and rotatable therewith, transfer means interconnecting said sleeve with said shaft whereby said sleeve rotates proportionately relative to the rotation of said shaft, means to arrest rotation of said shaft, electromagnetic means operable to actuate said arresting means, means controlled by said electromagnetic means upon the operation of said electromagnetic means to sense the angular position of the stepped wheels in the arrested position of the shaft, and electrical circuit means associated with each sensing means selectable in accordance with the sensed positions of said sensing means, and means rotatable with said shaft to render one of said circuit means inoperative when the shaft is arrested in one predetermined angular zone of said shaft, and to render said one of said circuit means operative when the shaft is arrested out of said zone.

12. In combination, a pair of stepped wheels, each being representative of the same order and each being a predetermined angle offset one from the other, means to rotate said stepped wheels in unison, means to arrest the rotation of said stepped wheels, means to sense the arrested positions of each of said stepped wheels, electrical circuit means associated with each sensing means selectively settable in accordance with the sensed positions of said stepped wheels, means rotatable with said stepped wheels to condition one of said electrical circuit means to be effective when the arrested stepped wheels are sensed in said predetermined offset angle, and means to condition the other of said electrical circuit means to be effective when the stepped wheels are sensed in an arrested position out of said predetermined offset angle.

13. In combination, a shaft adapted to be rotated by instrument means, a stepped wheel of one order affixed to and rotatable with said shaft, a sleeve journalled on said shaft, a pair of stepped wheels of a higher order affixed to said sleeve, transfer means interconnecting said shaft and said sleeve whereby said sleeve rotates proportionately relative to the rotation of said shaft, a star wheel affixed to said shaft, means to engage said star wheel to arrest the rotation of said shaft, plural sensing means to sense the arrested positions of said stepped wheels, circuit means associated with each of said sensing means selectable in accordance with the sense of positions of said stepped wheels, switching means adapted to control the circuit means associated with the pair of stepped wheels of the higher order to make one circuit means normally effective and the other circuit means normally ineffective, and cam means defining an angular zone of the shaft carried by said star wheel for actuating said switching means to make the normally effective circuit means ineffective and the normally ineffective circuit means effective when said shaft is arrested within the zone defined by said cam means.

14. In a device of the class described, and combination, a shaft, a unit stepped wheel affixed to and rotatable with said shaft, a tens stepped wheel affixed to and rotatable with said shaft, a star wheel affixed to said shaft and rotatable therewith, a sleeve on said shaft, a pair of hundreds stepped wheels affixed to and rotatable with said sleeve, each of said hundreds wheels being radially offset one from the other, gearing interconnecting said shaft with said sleeve whereby said sleeve rotates proportional to rotation of said shaft, means adapted to engage said star wheel to arrest rotation of said shaft, a plurality of sensing means, each being adapted to sense the arrested positions of the respective stepped wheels, electrical circuit means, means carried by said sensing means adapted to engage said electrical circuit means to setup electrical circuits in accordance with the sensed positions of the stepped wheels, cam means mounted on said star wheel and rotatable therewith, switching means associated with the electrical circuit means for the pair of hundred wheels adapted to be alternately effective, whereby only one of said circuit means is effective at any time, and means cooperable with said cam means to alternately actuate said switching means in accordance with the angle at which said hundreds stepping wheels are arrested.

15. In a device of the class described, in combination, a shaft, a units stepped wheel affixed to and rotatable with said shaft, a tens stepped wheel affixed to and rotatable with said shaft, a star wheel affixed to said shaft and rotatable therewith, a sleeve on said shaft, a pair of hundreds stepped wheels affixed to and rotatable with said sleeve, each of said hundred wheels being radially offset one from the other, gearing interconnecting said shaft with said sleeve whereby said sleeve rotates proportionally to rotation of said shaft, means adapted to engage said star wheel to arrest rotation of said shaft, a plurality of sensing means, each being adapted to sense the arrested positions of the respective stepped wheels, electrical circuit means, means carried by said sensing means adapted to engage said electrical circuit means to setup electrical circuits in accordance with the sensed positions of the stepped wheels, cam means amounted on said star wheel and rotatable therewith, switching means associated with the electrical circuit means for the pair of hundreds stepped wheels adapted to be alternately effective, whereby only one of said circuit means is effective at any time, and means cooperable with said cam means to alternately actuate said switching means in accordance with the angle at which said hundreds stepping wheels is arrested, said means for actuating the switching means comprising a microswitch having an actuator, said actuator being adapted to be engaged by the cam means on star wheel when said hundreds stepping wheels are arrested in a critical zone, and said switching means being further adapted to maintain one electrical circuit means in operative condition when the star wheel is arrested in any position other than the critical zone.

References Cited in the file of this patent

UNITED STATES PATENTS

| | | |
|---|---|---|
| 1,446,963 | Crane | Feb. 27, 1923 |
| 1,577,012 | Crane | Mar. 16, 1926 |
| 2,192,421 | Wallace | Mar. 5, 1940 |
| 2,238,363 | Hadley | Apr. 15, 1941 |
| 2,385,323 | Williams | Sept. 18, 1945 |
| 2,496,585 | Harper | Feb. 7, 1950 |
| 2,666,912 | Gow et al. | Jan. 19, 1954 |